United States Patent [19]

Nakayama

[11] Patent Number: 5,249,240
[45] Date of Patent: Sep. 28, 1993

[54] PROGRAM CREATING METHOD
[75] Inventor: Mamoru Nakayama, Tokyo, Japan
[73] Assignee: T.A.S. & Trading Co., Ltd., Japan
[21] Appl. No.: 840,308
[22] Filed: Feb. 24, 1992
[30] Foreign Application Priority Data
Mar. 19, 1991 [JP] Japan ............................. 3-78185
[51] Int. Cl.⁵ ............................................ G06K 9/62
[52] U.S. Cl. .................................. 382/14; 382/41; 382/61
[58] Field of Search ............... 382/61, 14, 15, 41, 382/44; 358/448, 452, 453; 395/20
[56] References Cited

U.S. PATENT DOCUMENTS

| | | | |
|---|---|---|---|
| 4,021,777 | 5/1977 | Shepard | 382/61 |
| 4,157,783 | 6/1979 | Muster et al. | 382/61 |
| 4,504,969 | 3/1985 | Suzuki et al. | 382/61 |
| 4,589,144 | 3/1986 | Namba | 382/61 |
| 4,760,606 | 7/1988 | Lesnick et al. | 382/61 |
| 4,811,416 | 3/1989 | Nakamura | 382/41 |
| 4,933,979 | 6/1990 | Suzuki et al. | 382/61 |
| 4,941,184 | 7/1990 | Sato | 382/61 |
| 5,003,613 | 3/1991 | Lovelady et al. | 382/17 |
| 5,134,669 | 7/1992 | Keogh et al. | 382/61 |

Primary Examiner—Joseph Mancuso
Attorney, Agent, or Firm—Lorusso & Loud

[57] ABSTRACT

Disclosed is a method for creating easily and quickly a program that allows new slips to be read by an automatic reading apparatus. A new slip is first input to the automatic reading apparatus. The reading apparatus reads from the slip its reference symbol and its information patterns indicating areas in which to write alphanumeric characters. The reference symbol is interpreted and assigned a numeric code that places the slip in an appropriate category. From each slip, the coordinates of a plurality of information patterns therein are detected. The areas designated by the coordinates are separated into numeric data and image data entry areas. These areas are defined using accounting terms. It is then defined that a numeral is recognized from the image of each numeric data area, and that an image is extracted and transferred from each image data area. Each interpreted numeric code, each assigned category, the coordinates of each numeric and image data entry area, and other necessary definitions are recorded into memory.

13 Claims, 9 Drawing Sheets

FIG. 6

TRANSFER SLIP

READING OF INPUT COORDINATES

INPUT COORDINATES

| | TOP LEFT CORNER | BOTTOM RIGHT CORNER |
|---|---|---|
| 1 | 18.0/109.3 | 29.0/129.5 |
| 2 | 18.0/134.0 | 29.0/166.5 |
| 3 | 18.5/ 44.0 | 29.0/ 59.0 |
| ⋮ | | |
| 19 | 52.5/179.0 | 60.0/224.7 |
| 20 | 54.0/ 19.0 | 60.0/ 23.0 |

FIG. 9

TRANSFER SLIP

| DATE | COMPANY CODE | AMOUNT | REMARKS |
|------|--------------|--------|---------|
| 21   | 1001         | 1.000  | ENTERTAINMENT EXPENSES FOR MR. TANAKA |

75

[X] — 3c 3a, 3b labels; coordinates X0, X1, X2, X3, X4, X5

FIG. 10

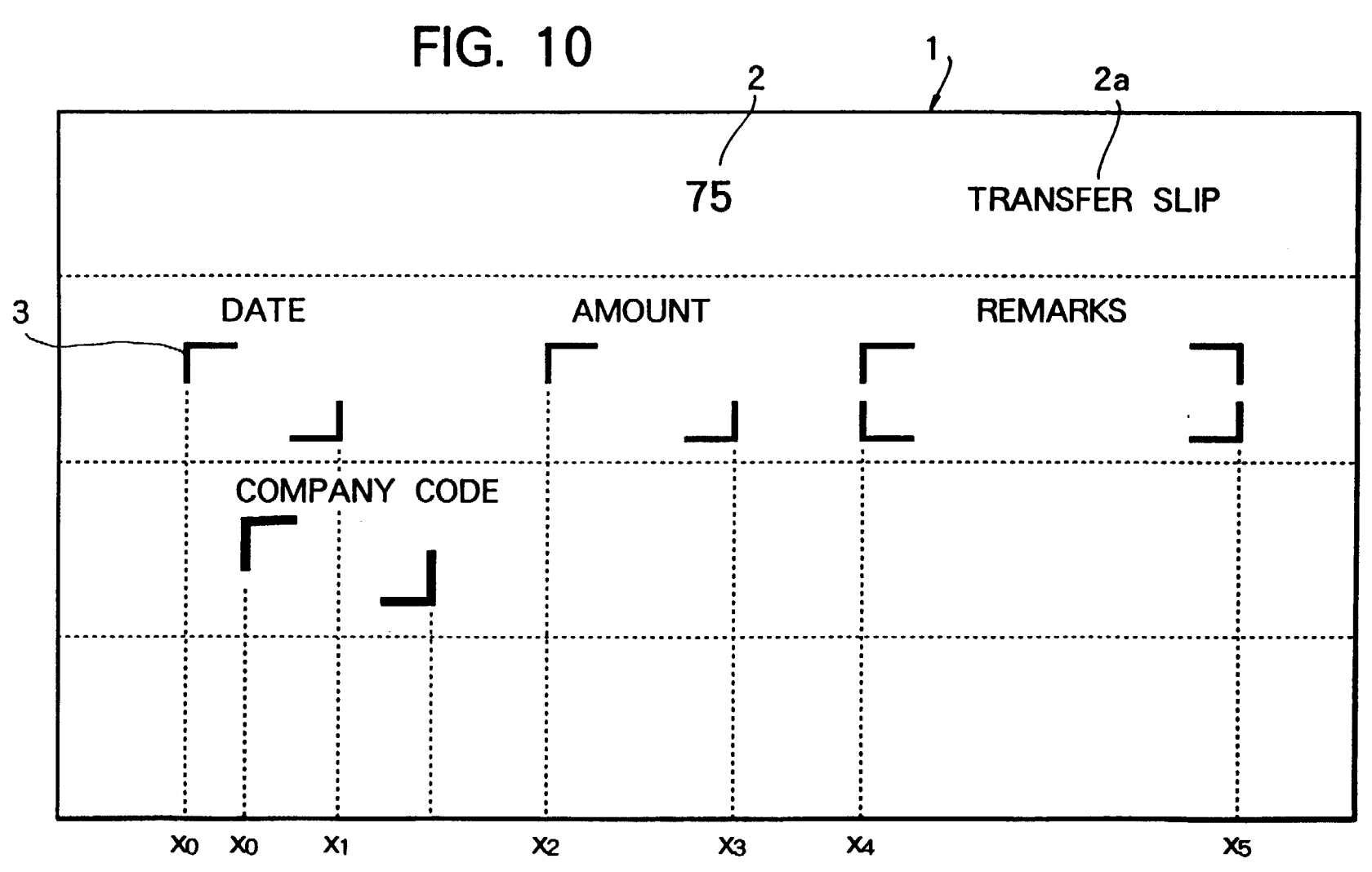

TRANSFER SLIP

REMARKS

AMOUNT

DATE  COMPANY CODE

75 x0  x0  x1  x2  x3  x4  x5

PROGRAM CREATING METHOD

BACKGROUND OF THE INVENTION

1. Field of the Invention

The present invention relates to a program creating method and, more particularly, to a method of creating programs for inputting newly created accounting slips into an accounting data processing apparatus.

2. Description of the Prior Art

Today, it is a widespread practice to have an optical character reader (OCR) automatically read accounting slips and to arrange the receipts and disbursements read therefrom into appropriate accounting format by date and by account before entry into the respective ledgers. The automated reading of slips involves reading previously formatted programmed slips according to a predetermined set of rules. The programmed slip is a slip which is registered in a file of the accounting data processing apparatus and whose rules and handling procedures are incorporated in the accounting program. The typical prior art method of automatically reading slips is as follows: Referring to FIG. 10, the accounting data processing apparatus, operating under control of the accounting program, illustratively recognizes a number "75" identified by reference numeral 2 in a slip 1. The apparatus checks the code "75" against existing file data and judges the slip to be a transfer slip. The data in the slip 1 is then processed according to the accounting rules specific to the transfer slip.

However, if the slip 1 is not found to be programmed (i.e., newly created slip), it cannot be assigned to any existing file data. That is, the OCR may read the slip but the data processing apparatus is incapable of processing the data therefrom. To process automatically such newly created slips requires developing another program for automatic reading of the new type of slips. Conventionally, such programs have been developed by specialized programmers within their ability and responsibility.

One distinct disadvantage of the prior art method is this: that because of the absence of appropriate programming tools to develop programs that process newly created slips, the burdens of developing those programs have so far been shouldered mostly by programmers whose scope of work is necessarily limited by their particular aptitudes and abilities. Another disadvantage of the prior art is that it take considerable time, labor and cost to develop needed programs. Furthermore, once finished, the automatic slip reading program is relocated on a medium such as a disc from the place of development to a usually distant site of use where the program is run on the accounting data processing apparatus. This is where another disadvantage can emerge. Under the circumstances, it takes additional time and effort to deal with errors that may occur while the newly created program is being run.

Illustratively, today's financial circles utilize more than 100 types of slips, and these slips are constantly supplemented by more slips that are newly created to deal with new transaction requirements. To create a new program to address each and every new type of slip with the prior art would take enormous amounts of time and money.

SUMMARY OF THE INVENTION

It is therefore an object of the present invention to provide a program creating method with which the accounting personnel of general competency with little background in programming can readily construct a program that deals with a new type of slip.

In achieving the foregoing and other objects of the invention and according to one aspect thereof, there is provided a program creating method comprising the steps of: inputting a newly created slip into an automatic optical character reader; reading from the slip a reference symbol that indicates the slip type and a plurality of information patterns that designate those areas of the slip into which to write characters and numerals; turning the image data of the reference symbol into numeric format for use as a numeric code; specifying the slip type by assigning a specific group or class to the numeric code; detecting a set of coordinates from the image data of each of the multiple information patterns; designating a numeric or image data area for each set of the coordinates; defining the designated areas by use of accounting items; defining numeric image recognition for the numeric data areas; defining image cutting and transferring for the image data areas; and recording decoded numeric codes, the assigned groups and classes, and the coordinates of the numerically recognized areas and image data transferred areas.

More specifically, the newly created slip is grouped or classified according to the numeric code represented by the reference symbol written on the slip. The coordinates of each information pattern designate an area into which to write information. The coordinate-designated areas are separated into numeric data areas and image data areas. The established class or group of the slip and the defined items thereof are recorded in a file. When newly created slip with accounting data written therein is read and recognized by the data processing apparatus, the corresponding program is executed for accounting in accordance with the definitions and related information stored in the file.

BRIEF DESCRIPTION OF THE DRAWINGS

FIG. 6 is a plan view of a newly created accounting slip for use with the invention;

FIG. 9 is a plan view of an illustratively filled accounting slip for use with the invention; and FIG. 10 is a plan view of the typical prior art accounting slip.

DESCRIPTION OF THE PREFERRED EMBODIMENT

Figure 1:
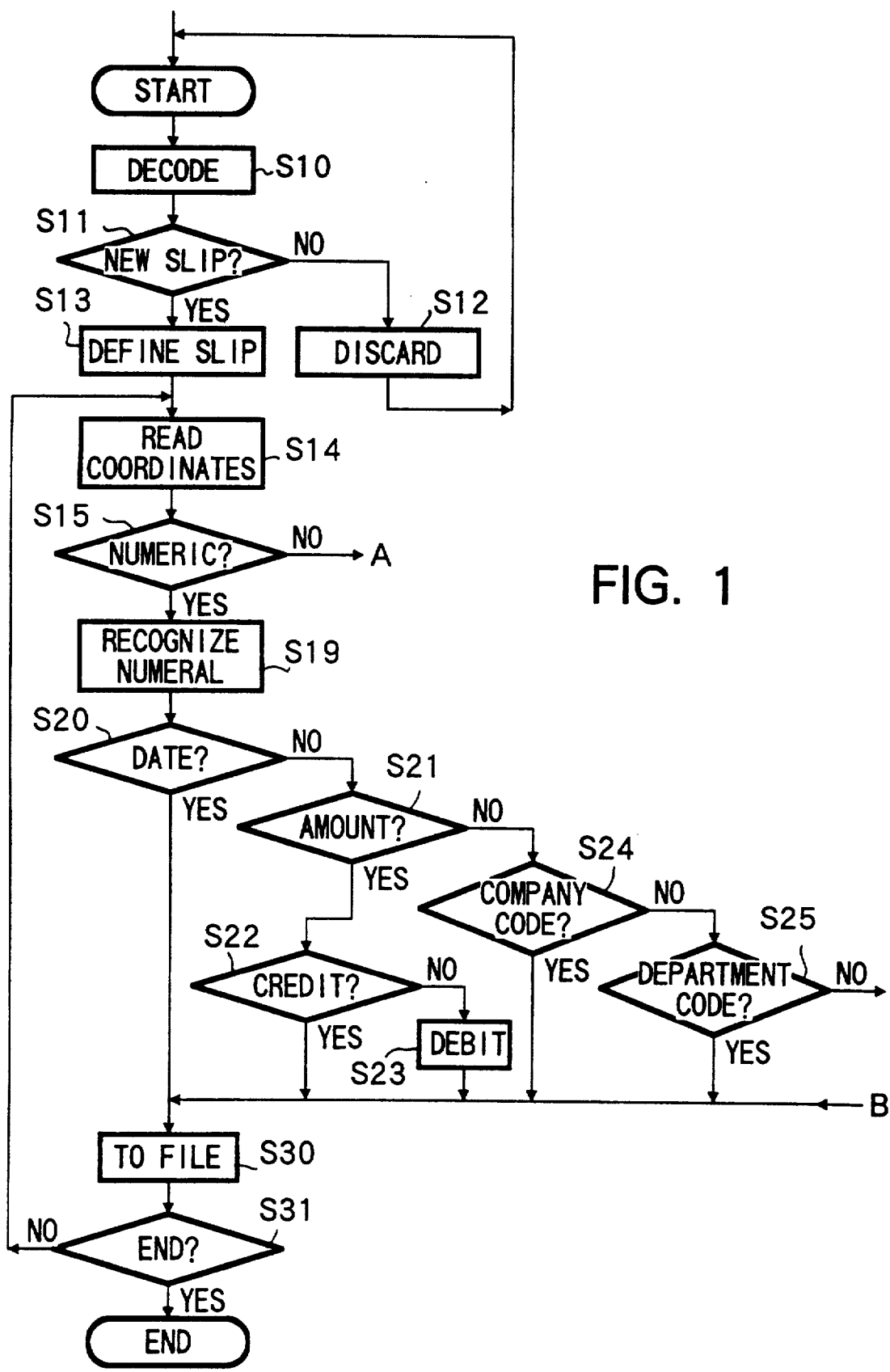
FIG. 1 is a flowchart comprising steps to process a numeric data area of a slip by use of the invention.

One preferred embodiment of the invention will now be described with reference to the accompanying drawings. Described first is the structure of the slip for use with the invention. The design items and conditions that will meet the specification of a desired slip are first enumerated. The requirements such as the location and area of data entry areas are then designated on the slip using, say, full brackets, split brackets and half brackets (see figures). When the slip size is determined and the brackets are printed, the format of the new split is finalized, complete with the necessary frames and markings. A new program to be created is one that will allow the data processing apparatus to recognize and process the new brackets frames and markings indicating the necessary items on the slip.

Figure 6:
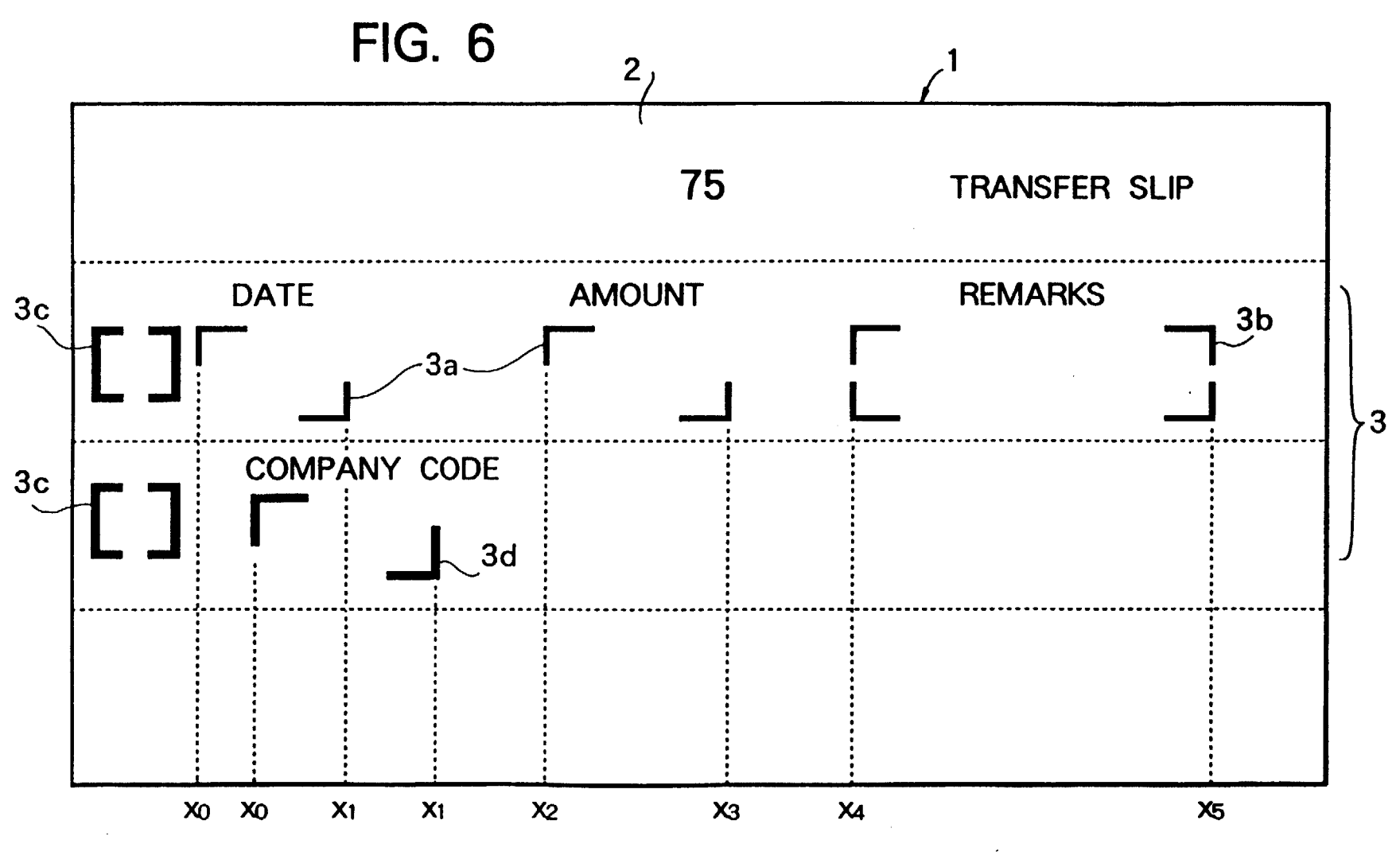

Referring to FIG. 6, a newly created slip 1 (simply called "the slip" from now on) has a reference numeral such as 75 and characters TRANSFER SLIP printed in a first region of the upper portion thereof. Printed in a second region is an information pattern comprising a pair of small brackets 3c, characters DATE, a pair of "half" brackets 3a underneath the DATE, characters AMOUNT, another pair of half brackets 3a underneath the AMOUNT, characters REMARKS, and a pair of "split" brackets 3b below the REMARKS. These markings may be printed in multiple patterns. Printed in a third region are a pair of small brackets 3c, characters COMPANY CODE, and a pair of larger brackets 3d beneath the COMPANY CODE. Fourth and subsequent regions not shown, repeat the printed characters and information patterns 3.

The reference numeral 75 defines the slip 1 as a transfer slip. Each information pattern 3 indicates the positions in which to write accounting information and the presence of corrections that may be made. The boundary between the reference numeral in the first region and the information pattern 3 in the second region as well as the boundary between the third and fourth region are shown in dotted lines. These dotted lines are printed in the so-called drop color and are thus not detected by an optical character reader (OCR), to be described later.

For each information pattern 3, it may be determined illustratively at the design stage to designate the small brackets 3c for use as an area in which to write, say, a character "x" that specifies effectiveness of the data on the current line. Likewise, the half brackets 3a may be designated as an area in which to write numeric characters, and the split brackets 3b as an area from which to extract image data. These conventions determined at the design stage are stored at that time into a ROM 19, to be described later.

When an operator is to create an accounting program on a man-machine basis, the brackets 3c, 3a or 3b on the slip 1 are all blank.

Figure 4:
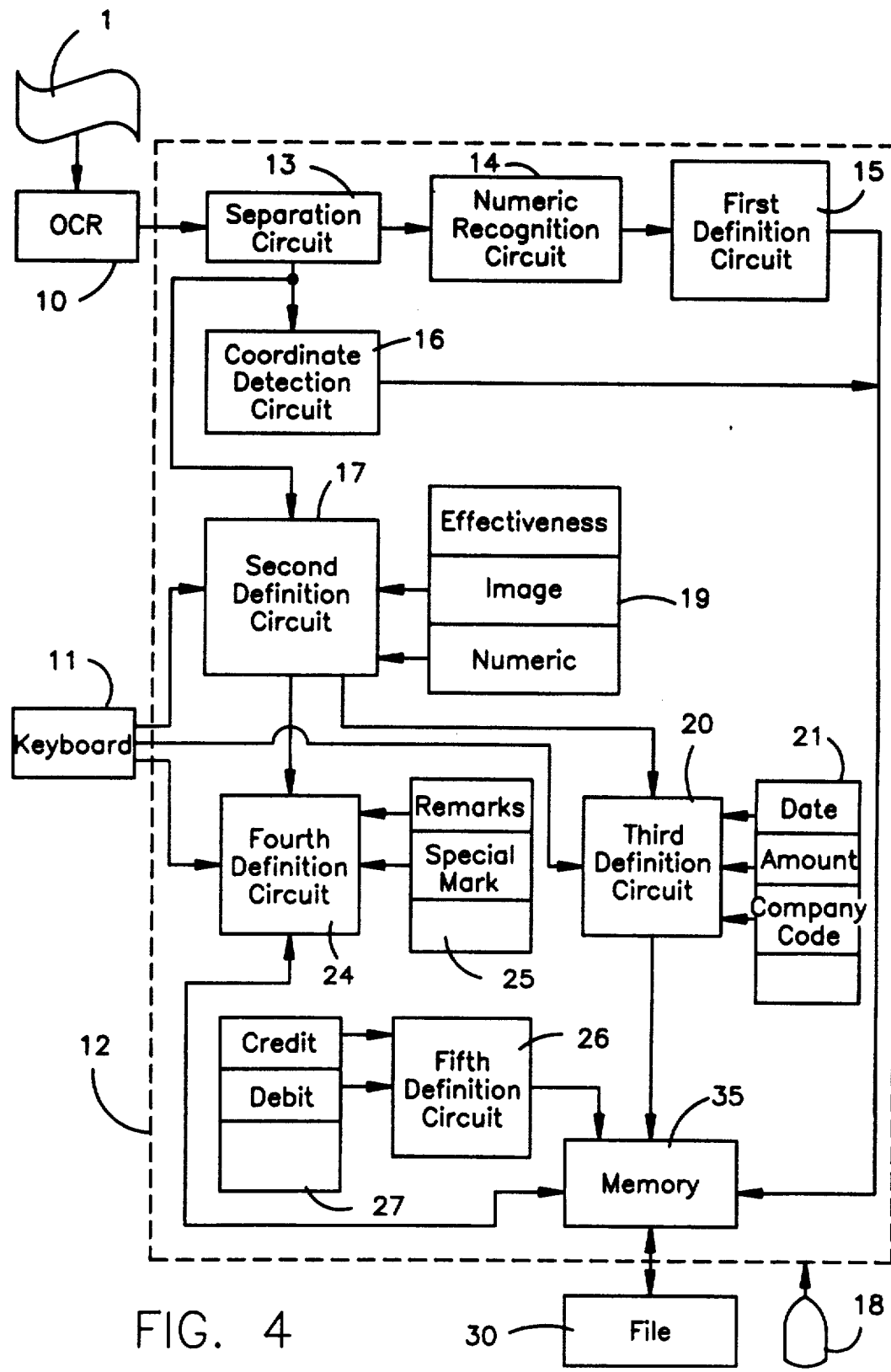
FIG. 4 is a block diagram of a data processing apparatus on which the invention is practiced.

FIG. 4 is a block diagram of a typical data processing apparatus on which the invention may be practiced. In FIG. 4, the print patterns such as the brackets 3a, the characters and other markings printed on the slip 1 are read by the OCR 10 (e.g., facsimile machine) for photoelectric conversion. The resulting image data are input to a data processor 12. The data processor 12 also receives commands and decisions from the operator through a keyboard 11. The data are displayed on a display unit 18 while they are being processed.

The data processor 12 comprises a separation circuit 13, a numeral recognition circuit 14, a first definition circuit 15, a coordinate detection circuit 16, a second definition circuit 17, a ROM 19, a third definition circuit 20, a ROM 21, a fourth definition circuit 24, a ROM 25, a fifth definition circuit 26, a ROM 27, a file 30 in the form of a magnetic disc or the like, and a RAM 35 acting as a working memory. If high access speeds are desired, the ROM's 19, 21, 25 and 27 may be constituted by IC ROM's. If lower access speeds are acceptable, the ROM's 19, 21, 25 and 27 may be replaced by magnetic discs, or the file 30 may be divided into smaller files.

On receiving image data from the OCR 10, the separation circuit 13 counts the number of scanning lines so as to separate the lines on the slip. In doing so, the separation circuit 13 separates the reference numeral 2 (e.g., "75" in this example) from the information pattern 3. The numeral recognition circuit 14 recognizes (i.e., codes) the numeric characters from the image data of the reference numeral 2 (i.e., 75). The first definition circuit 15 defines the slip name such as the transfer slip in response to the coded numeral. The coordinate detection circuit 16 receives from the separation circuit 13 various image data in the information pattern 3 from the second region on, and detects the coordinates of the image data such as the brackets 3a and 3b.

At the design stage, the conventions such as those that follow are established: If the received image data comprise small brackets 3c, the data represent an alphabetic character entry area. A check is then made to see if the area is blank or contains a character "x" that specifies effectiveness of the data of the current line. If the received image data contain half brackets 3a, the data represent a numeral entry area. The image data within the brackets 3a are sent to the numeral recognition circuit 14. If the received image data comprise split brackets 3b, the data represent an image data area from which to extract image data. If the received image data contain brackets 3d, the data represent a katakana entry area. The above design conventions are stored in advance in the ROM 19. The ROM 21 contains a previously stored design data menu comprising the items DATE, AMOUNT, COMPANY CODE, DEPARTMENT CODE, etc., which correspond to numeric characters. The ROM 25 stores in advance the terms REMARKS, SPECIAL MARK and others which correspond to image data. The ROM 27 stores beforehand the terms CREDIT and DEBIT keyed to the category of the amount.

The second definition circuit 17 compares the input image data from the separation circuit 13 with the design data from the ROM 19. In doing so, the circuit 17 defines the input data as those designating a line effectiveness determining area, an image data area or a numeral area. The third definition circuit 20 defines the numeral data as a date, an amount, a company code or a department code in accordance with the design data from the ROM 21. The fourth definition circuit 24 defines the image data as remarks or a special mark according to the design data from the ROM 25. The fifth definition circuit 27 defines the amount as a debit amount or a credit amount as per the design data from the ROM 26.

Below is a description of how an accounting program for processing the new slip 1 is created using the invention, with reference to the block diagram of FIG. 4 and to the flowcharts of FIGS. 1 through 3.

Figure 3:
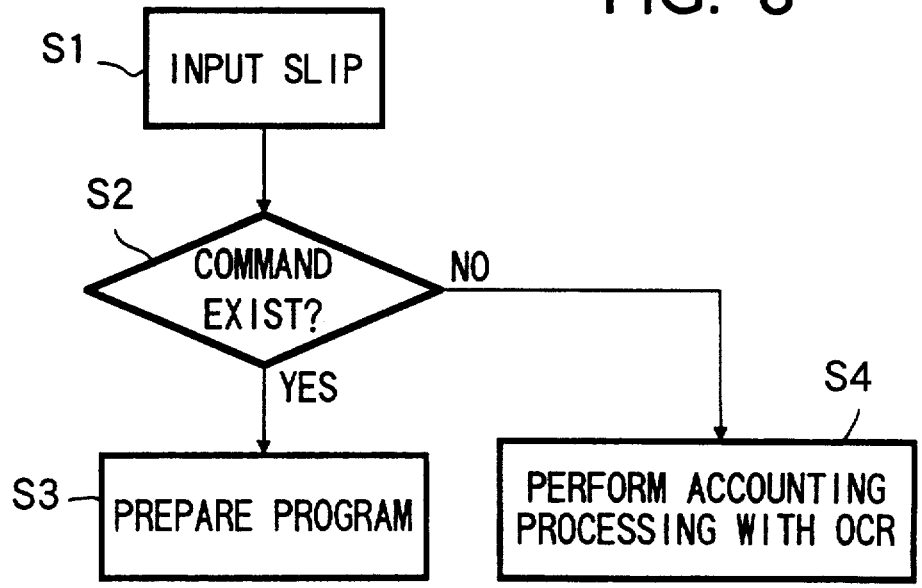
FIG. 3 is a flowchart showing the overall flow of the operations implemented by use of the invention.

The flowchart of FIG. 3 shows the overall flow of the program creating steps involved. In step S1, the slip 1 is scanned by the OCR 10 so that all characters and markings on the slip 1 will be read as image data. Because the data processor 12 is also involved in automatically reading programmed slips, the data processor 12 displays in step S2 whether or not a program creating command is input and asks the operator what to do. If there is furnished a program creating command, step S3 is reached in which programming is initiated. If no program creating command exists, step S4 is reached. In step S4, the slip is handled as a previously programmed slip and its corresponding accounting program is executed accordingly.

How the programming of step S3 proceeds will now be described in more detail with reference to the flowchart of FIG. 1 and to the block diagram of FIG. 4.

The new slip 1 is scanned by the OCR 10 so that all markings and characters on the slip will be read as image data. The image data are stored temporarily in the memory 35 and simultaneously displayed on the display unit 18. The separation circuit 13 counts the number of scanning lines in the OCR 10 to distinguish the lines on the slip, thereby processing the reference numeral 2 (number 75) and the image data of characters TRANSFER SLIP in the first region. In step S10, the numeric recognition circuit 14 receives the image data and recognizes numeric characters therefrom using known techniques.

In step S11, using the recognized numeric characters 75 as the keyword, the first definition circuit 15 checks to see if the numeric code 75 is already defined in the file 30. If the code 75 is found to have been defined in the file 30, step S12 is reached. In step S12, the received data are discarded so as to avoid duplicate definition, and the processing reverts to its beginning for another input of a new slip 1. If the numeric code 75 is found to be undefined, step S13 is reached. In step S13, the characters TRANSFER SLIP displayed on the display unit 18 are matched with the recognized numeric code 75, and the characters TRANSFER SLIP are assigned from the design data menu to the slip and defined for the latter.

When the name TRANSFER SLIP is to be assigned to the code 75 of the slip 1, the received image data and the previously stored definition menu in the file 30 are displayed concurrently on the display unit 18. After comparing the menu with the image data, the operator verifies and inputs the data for definition.

For the information pattern 3 from the second region on, the separation circuit 13 supplies the coordinate detection circuit 16 with the image data such as the first-encountered small brackets 3c and the half brackets 3a. In turn, the coordinate detection circuit 16 detects the coordinates of the brackets 3c, 3a and other image data. How the coordinate axes are taken for, say, the half brackets 3a will now be described with reference to FIG. 7. The location of the leading half bracket 3a is detected first in the X direction and then in the Y direction. The resulting coordinates are stored in the memory 35.

Figure 7:
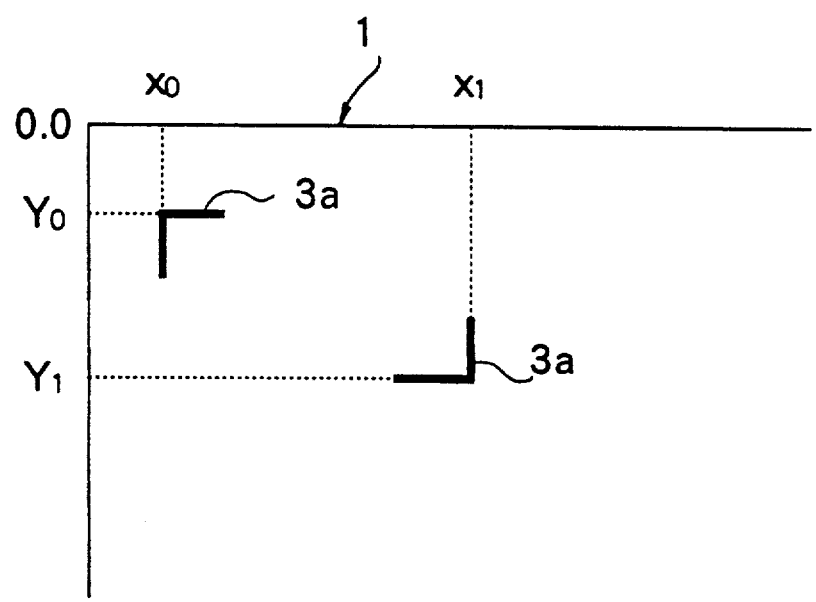
FIG. 7 is a view depicting how coordinates are established by use of the invention.

In step S14, coordinates are read. Specifically, as shown in FIG. 7, the top left corner of the slip 1 is considered to be the origin (0, 0). The coordinates of the top left corner (X0, Y0) of the leading half bracket 3a, and the coordinates of the bottom right corner (X1, Y1) of the trailing half bracket 3a, are read with respect to the origin. The coordinates (X0, Y0) and (X1, Y1) are used to define the position and area into which to write characters and others within the pair of half brackets 3a. Likewise, the coordinates of the top left corner (Xi, Yj) and those of the bottom right corner (Xk, Yl) are read for the smaller brackets 3c, the split brackets 3b, and the larger brackets 3d.

Figure 8:
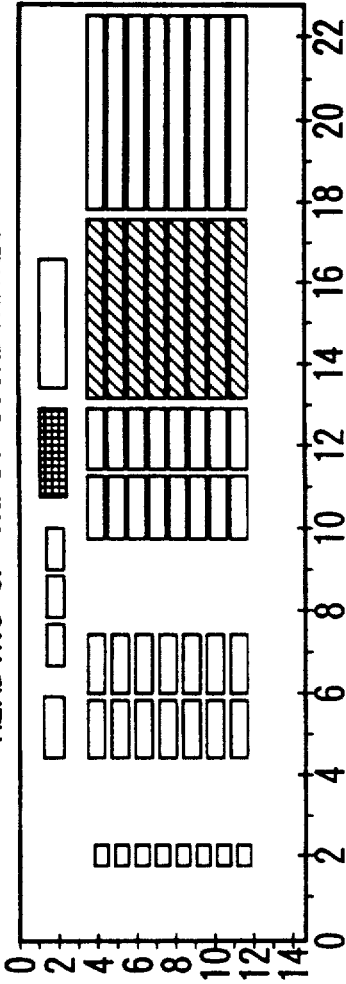
FIG. 8 is a view of screens on which previously read coordinates and image coordinates are illustratively displayed by use of the invention.

FIG. 8 contains two views. One view indicates a list of the coordinates obtained in the manner regarding the brackets 3a and other image data. The other view depicts a display screen comprising the slip 1 in its entirety together with the arrangement of the markings such as the brackets 3a in the slip. In FIG. 8, all brackets are indicated in the form of rectangles so as to delineate each data entry area for the corresponding coordinates. The list of the coordinate data is stored in the memory 35. Using the keyboard 11, the operator may move image data, remove noise, or forcibly modify coordinate values where desired. In FIG. 8, the mesh-covered region indicates that the data therein is being edited, and the painted areas represent image data areas.

In step S15, the second definition circuit 17 compares the received image data With the design data in the ROM 19. If the image data received from the slip 1 is found to represent the half brackets 3a (for numeric data), the second definition circuit 17 judges the current coordinate area in the slip 1 to be for entry of numeric data.

Figure 2:
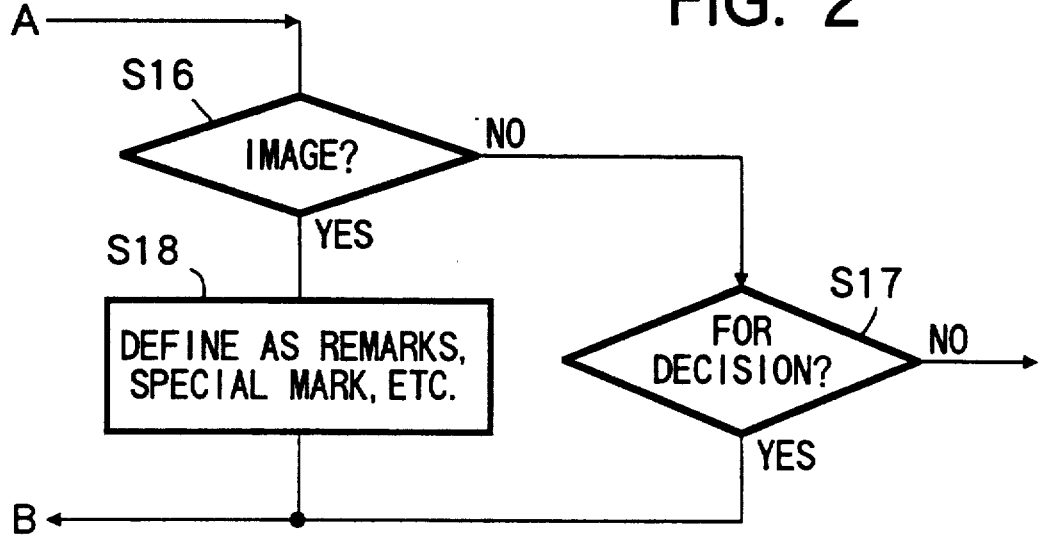
FIG. 2 is a flowchart containing steps to process an image data area of a slip by use of the invention.

If, in step S15, the image data is found to represent not the half brackets 3a but the split brackets 3b, step S16 is reached (following the arrow A into the flowchart of FIG. 2). Because the received image data coincide with the image data about split brackets in the design data, the second definition circuit 17 judges in step S16 the current coordinate area to be an area from which to extract image data. If the received image data do not represent the split brackets 3b, step S17 is reached. In step S17, if the received image data represent the small brackets 3c, the data coincide with the bracket data (for determining effectiveness of the data of the current line) from within the design data. Thus the current coordinate area is defined as the area into which to write the effectiveness determining symbol of, say, X. Based on the design data, the second definition circuit 17 always assigns the image data of the information pattern 3 to either of the two settings above and defines the received data as such.

When the split brackets 3b are defined in step S16 as the area from which to extract image data it is also defined to send the image data inside the split brackets as attribute data 3b to a transfer circuit, not shown. That is, the second definition circuit 17 supplies the fourth definition circuit 24 with the coordinates (Xi, Yj) and (Xk, Yl) of the split brackets 3b, and step S18 is reached. The fourth definition circuit 20 displays on the display unit 18 the design data menu which is read from the ROM 25 and which contains REMARKS, SPECIAL MARK and other items. The purpose of this operation is to help the operator determine the image data item found inside the brackets 3b. Watching the display screen, the operator defines the image data (i.e., written characters) inside the brackets 3b with the coordinates (Xi, Yj) and (Xk, Yl), as one of REMARKS, SPECIAL MARK, etc., in step S18.

If a numeral entry area is defined in step S15, step S19 is reached in which it is defined to send the image data within the half brackets 3a as attribute data to a numeric recognition circuit, not shown. That is, the second definition circuit 17 forwards to the third definition circuit 20 the coordinates (X0, Y0) and (X1, Y1) of the half brackets 3a. The third definition circuit 20 reads image data from the memory 35 and displays on the display unit 18 the characters DATE along with the design data menu from the ROM 21. The purpose of this operation is to help the operator determine the numeric item written into the brackets 3a. Verifying the image data DATE on the screen, the operator in step S20 defines as the date the item written into the brackets 3a with the coordinates (X0, Y0) and (X1, Y1). Because the brackets 3a with other coordinates are found to represent an amount and not a date, step S21 is reached. On the display screen, the image data are compared with the menu retrieved from memory. The operator finds the matching item such as the AMOUNT and defines it for the data.

When the image data are defined as the amount in step S21, step S22 is reached. The third definition circuit 20 forwards to the fifth definition circuit 26 the coordinates (XO, Y0) and (X1, Y1) of the half brackets 3a. The fifth definition circuit 26 reads from the ROM 27 the design data menu containing CREDIT and DEBIT and displays the menu on the display unit 18. The purpose of this operation is to help the operator determine the type of the amount written in the brackets 3a. If the design data from the slip 1 is CREDIT, the operator defines the amount in the brackets 3a as a credit figure; if the data from the slip is found to be DEBIT, the operator goes to step S23 and defines the amount in the brackets 3a as a debit figure.

The brackets 3a whose coordinates are (Xi, Yj) and (Xk, Yl) and which are not found to contain an amount in step S21 are defined otherwise after comparison with the design data menu. That is, the brackets may be defined illustratively as containing a COMPANY CODE in step S24, or a DEPARTMENT CODE in step S25. The program may be extended in design so that other definitions can be made following step S25.

When the third definition circuit 20 compares the image data with the design data from the ROM 21 for item definition in steps S20, S21 and S22,the previously designed item such as the COMPANY CODE on the slip 1 may be replaced with another item such as a DEPARTMENT CODE by use of the design data. The items and data defined up to step S25 are transferred to and stored in the file 30. The data to be stored include the following: that the brackets 3a with the coordinates (X0, Y0) and (X1, Y1) are defined as a numeral entry area; that the image data within the brackets 3a are sent to the numeral recognition circuit; and that the current item is defined as any of the DATE, COMPANY CODE, DEPARTMENT CODE, etc.

The above steps are repeated until all information patterns 3 are covered (i.e., up to step S31). In this manner, the images on the new slip 1 are defined in the order in which the OCR 10 reads them from the slip. These definitions are given appropriate functions before being stored in the file 30. This completes construction of the new accounting program.

Figure 5:
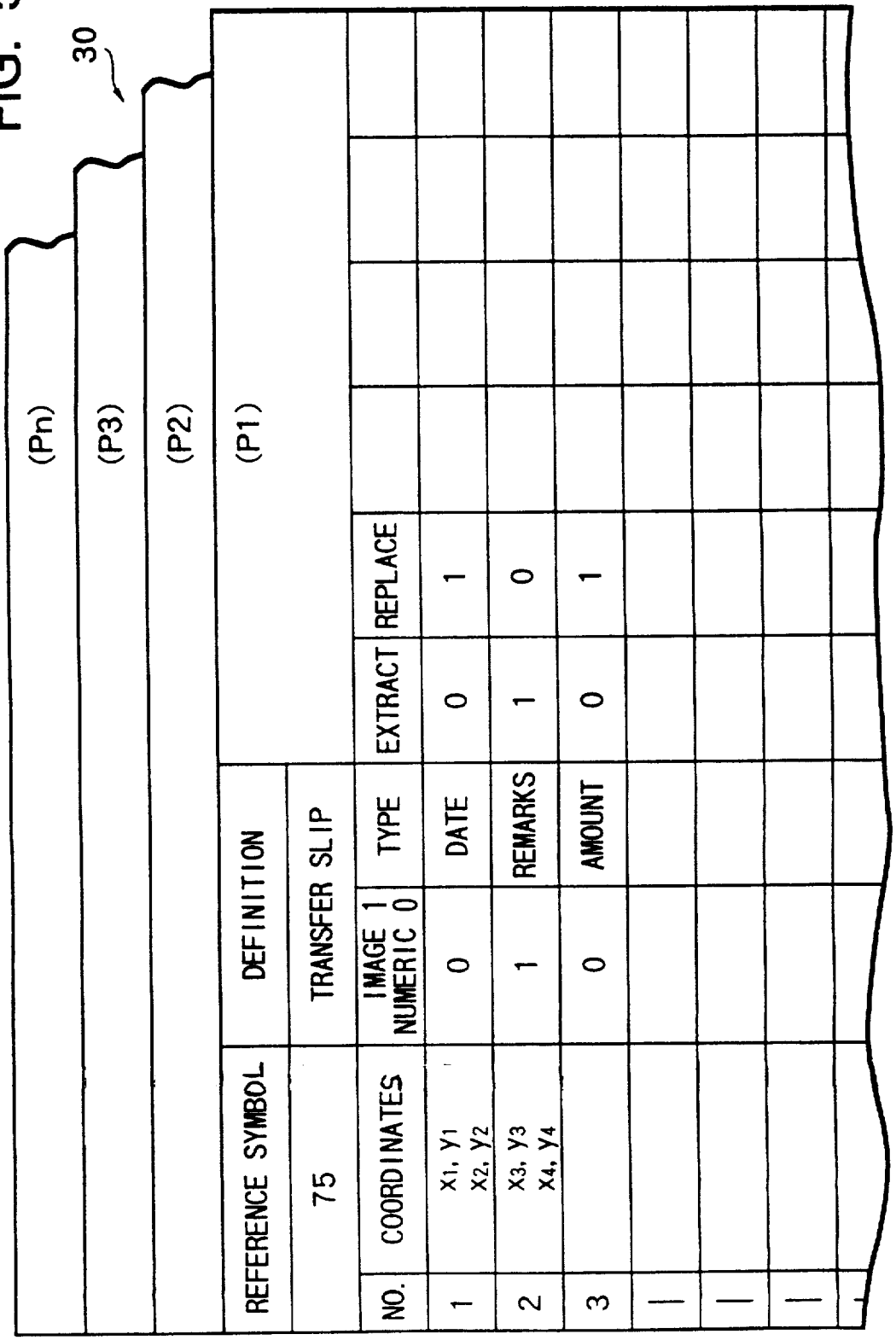
FIG. 5 is a file structure view of typical items confirmed to be defined in a slip in connection with the invention.

The defined contents in the file 30 will now be described with reference to FIG. 5. Each of the pages P1 through Pn contains the information defined for various slips. The page P1 comprises the information that has just been defined in the above-described steps. That is, the slip 1 is assigned a reference numeral 75 and defined as a transfer slip. The information pattern 3 involves numbering the detected image data items (i.e., 1, 2, 3, etc.). Each data item number in the information pattern 3 (e.g., brackets 3a) is assigned its own coordinates (X1, Y2, X2, Y2). In addition, the information pattern 3 illustratively contains the numeric character 0 for defining a numeral entry or 1 for an image entry; the data item type; numeric character 0 for defining an area of no image extraction or 1 for an image extraction area; and numeric character 1 for recognizing numeric data within the brackets 3a and converting it into a numeric code or 0 for not doing the same.

The above definitions are likewise recorded regarding the brackets on lines 2, 3, 4, etc.

What follows is a brief description of how the data processor 12 automatically reads the defined slip 1 containing actual accounting information.

Referring to FIG. 9, the OCR 10 reads the slip 1. In response to the reference numeral 75 that is read, the defined page Pi of the slip 1 is retrieved from the file 30. According to the retrieved definition, the slip 1 is judged to be a transfer slip.

For example, the brackets first encountered on line 2 contain a character X. This means that the data of this line are effective. The item of the brackets 3a is a date, with a numeral 21 inside indicating the day of the month. The numeric characters 21 are replaced with appropriate print characters. The split brackets 3b contain handwritten image data such as "travel expenses for Mr. Tanaka." The data extracted from the brackets 3b are transferred to the REMARKS field in the corresponding ledger.

In the above embodiment of the invention, the information pattern is constituted mainly by brackets. Alternatively, the information pattern may comprise ordinary parentheses, braces and other markings which may be selected as desired at the design stage. The reference numeral may be replaced with other symbols.

The design data for use at the defining stage may be provided in the form of dictionaries or may be stored as they are needed. The items to be defined may be modified as required before they are defined.

As described, the novel program creating method according to the invention classifies a new slip according to its reference numeral, turns the coordinate areas of each information pattern into the corresponding accounting item entry areas, separates these areas into numeric data entry areas and image data entry areas, and stores into a file the classified items and their definitions. With the aid of this novel method for programming new slips, accounting personnel with little background in software preparation can readily create new OCR-ready slips whenever required.

As many apparently different embodiments of this invention may be made without departing from the spirit and scope thereof, it is to be understood that the invention is not limited to the specific embodiments thereof except as defined in the appended claims.

What is claimed is:

1. A program creating method comprising the steps of:

reading an image from an accounting slip by an automatic reading apparatus to generate image data;

said image including a reference symbol for indicating a category of said slip and an information pattern for designating an area in which alphanumeric characters are written:

outputting the image data of said reference symbol and said information pattern from said automatic reading apparatus to a data processing apparatus;

interpreting by said data processing apparatus the image data of said reference symbol and coding the result thereof into a numeral;

assigning by said data processing apparatus a category to said codes numeral;

recording said coded numeral and said assigned category into a memory device;

displaying the image data of said information pattern on a display unit;

detecting by said data processing apparatus coordinates of the image data of said information pattern with respect to a coordinate system of said display unit;

recording said detected coordinates into said memory device;

defining by said data processing apparatus said detected coordinates as those designating a numeric data entry area;

defining by said data processing apparatus a significant term for describing said defined numeric data entry area;

recording the definition of said coordinates and said defined term into said memory device;

designating further processing steps of converting and using numeric data from the image of said numeric data entry area; and recording the designation of said further processing steps into said memory device.

2. A program creating method comprising the steps of:

reading an image from an accounting slip by an automatic reading apparatus to generate image data;

said image including a reference symbol for indicating a category of said slip and an information pattern for designating an area in which alphanumeric characters are written;

outputting the image data of said reference symbol and said information pattern from said automatic reading apparatus to a data processing apparatus;

interpreting by said data processing apparatus the image data of said reference symbol and coding the result thereof into a numeral;

assigning by said data processing apparatus a category to said coded numeral;

recording said coded numeral and said assigned category into a memory device;

displaying the image data of said information pattern on a display unit;

detecting by said data processing apparatus coordinates of the image data of said information pattern with respect to a coordinate system of said display unit;

recording said detected coordinates into said memory device;

defining by said data processing apparatus said detected coordinates as those designating an image data entry area;

defining by said data processing apparatus a significant term for describing said defined area;

recording the definition of said coordinates and said defined term into said memory device;

designating further processing steps of extracting and transferring the image data from said image data entry area; and recording the designation of said further processing steps into said memory device.

3. A program creating method comprising the steps of:

reading an image from an accounting slip by an automatic reading apparatus to generate image data;

said image including a reference symbol for indicating a category of said slip and first and second information patterns for designating areas in which alphanumeric characters are written;

outputting the image data of said reference symbol and said first and second information patterns from said automatic reading apparatus to a data processing apparatus;

interpreting by said data processing apparatus the image data of said reference symbol and coding the result thereof into a numeral;

assigning by said data processing apparatus a category to said coded numeral;

recording said coded numeral and said assigned category into a memory device;

displaying the image data of said first and second information patterns on a display unit;

detecting by said data processing apparatus respective first and second coordinates of the image data of said first and second information patterns with respect to a coordinate system of said display unit;

recording said first and second detected coordinates into said memory device;

defining by said data processing apparatus said first detected coordinates as those designating a numeric data entry area;

defining by said data processing apparatus said second detected coordinates as those designating an image data entry area;

defining by said data processing apparatus respective significant terms for describing said defined numeric data entry area and said defined image data entry area;

recording the definitions of said first and second coordinates and said defined terms into said memory device in association with the respective recorded first and second coordinates;

designating first further processing steps of converting and suing numeric data from the image of said numeric data entry area;

designating second further processing steps of extracting and transferring the image data from said image data entry area; and recording the designating of said first and second further processing steps into said memory device in association with the respective recorded first and second coordinates.

4. A program creating method according to claim 3, wherein said reference symbol comprises a plurality of line segments having different lengths.

5. A program creating method according to claim 4, wherein said reference symbol is turned into a numeric code by comparing those adjacent of said plurality of line segments in terms of length, the longer and the shorter segments being assigned 0 and 1 so as to constitute said numeric code.

6. A program creating method according to claim 3, wherein said first and second information patterns comprise respective patterns selected from diverse kinds of brackets, parentheses and frames.

7. A program creating method according to claim 3, wherein said automatic reading apparatus is a facsimile machine.

8. A program creating method according to claim 3, wherein said assigned category is an accounting category.

9. A program creating method according to claim 3, wherein said memory device is a magnetic recording apparatus.

10. A program creating method according to claim 3, wherein the coordinate system of said display unit is established with reference to one of the corners of the screen thereof.

11. A program creating method according to claim 3, wherein said data processing apparatus is an electronic computer.

12. A program creating method according to claim 3, wherein said significant terms are accounting terms.

13. A program creating method according to claim 3, wherein the first and second coordinates of said respective first and second information patterns are extracted from the outer circumferences of the image data of said patterns.

* * * * *

UNITED STATES PATENT AND TRADEMARK OFFICE
CERTIFICATE OF CORRECTION

PATENT NO. : 5,249,240
DATED : September 28, 1993
INVENTOR(S) : Mamoru NAKAYAMA

It is certified that error appears in the above-indentified patent and that said Letters Patent is hereby corrected as shown below:

Col. 3, line 11, after "brackets" insert a comma --,--.

Col. 6, line 16, delete "With" insert --with--;

line 42, after "data" insert a comma --,--.

Col. 8, line 66, delete "codes" insert --coded--.

Col. 10, line 36, delete "suing" insert --using--.

Signed and Sealed this

Thirty-first Day of May, 1994

Attest:

BRUCE LEHMAN

Attesting Officer

Commissioner of Patents and Trademarks